July 28, 1931.  W. S. G. HEATH  1,816,254
AUTOMOBILE TAG SECURING AND IDENTIFICATION MEANS
Filed April 2, 1931
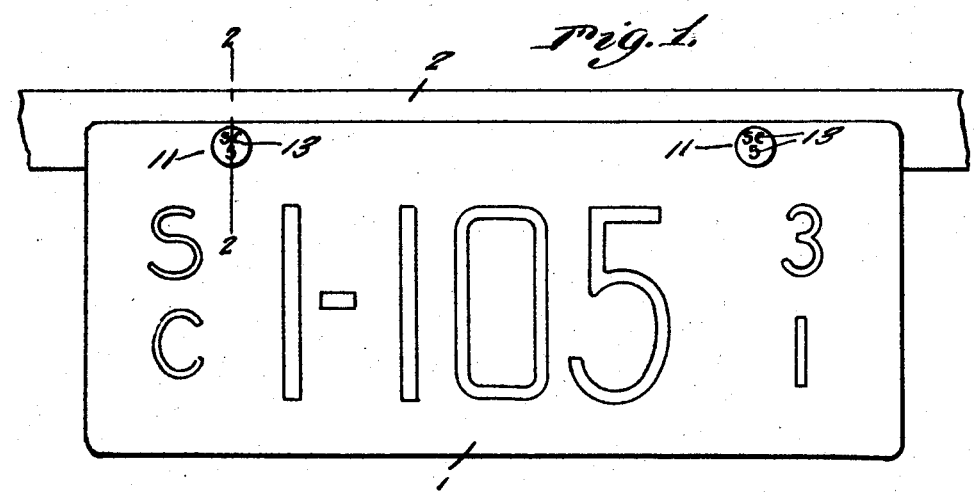
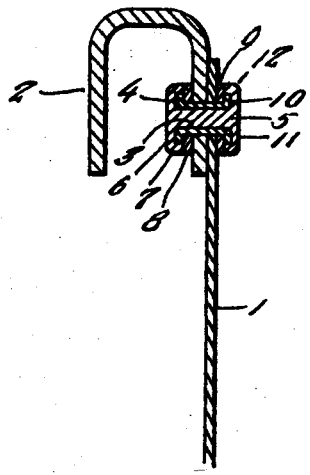
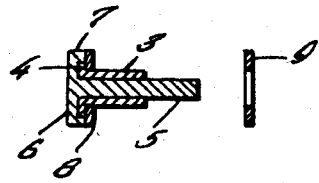
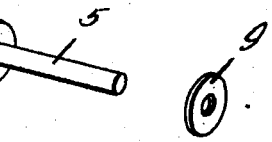
Inventor
W. S. G. Heath
By Clarence A. O'Brien
Attorney Patented July 28, 1931

1,816,254

UNITED STATES PATENT OFFICE

WILLIAM S. G. HEATH, OF EDGEFIELD, SOUTH CAROLINA

AUTOMOBILE TAG SECURING AND IDENTIFICATION MEANS

Application filed April 2, 1931. Serial No. 527,285.

This invention relates to an automobile tag securing and identification means and has for its primary object to provide, in a manner as hereinafter set forth, means for securing the usual tags or number plates in position on automobiles in a manner to render the theft or unauthorized removal thereof impossible without detection, the securing means further being provided with identifying numerals or characters to facilitate determining to whom the same may have been issued.

Other objects of the invention are to provide an automobile tag securing and identification means of the character described which will be simple in construction, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in elevation showing a license tag secured in position through the medium of means in accordance with this invention.

Figure 2 is a vertical sectional view taken substantially on the line 2—2 of Figure 1.

Figure 3 is a disassembled view of the device ready for use, said view being in longitudinal section.

Figure 4 is a perspective view showing a pair of the elements disassembled.

Referring to the drawings in detail, it will be seen that the reference numeral 1 designates a tag and 2 is the supporting bracket therefor of suitable conventional construction. The tag 1 and the supporting bracket 2 are, of course, provided with registering openings.

A securing device constituting this invention is inserted through the registering openings of the tag and bracket for securing said tag in position on the bracket. Said securing device comprises a tubular rivet 3 having an out-turned flange 4 on one end. A comparatively long core 5 of soft metal, preferably lead, is disposed through the tubular rivet 3 and has formed integrally on one end a head 6 having a marginal flange 7 formed thereon which is engaged with the outer periphery of the flange 4 of the rivet 3, as clearly seen in Figure 3 of the drawings. A washer 8 is then mounted on the rivet 3 and is disposed in abutting engagement with the inner side of the flange 4 and the free edge or end of the flange 7.

The rivet 3 and the core 5 are then inserted through registering openings in the supporting bracket 2 and the tag 1, the washer 8 abutting the side of the supporting bracket 2 which is free of the tag 1. A washer 9 is then mounted on the rivet 3 in abutting engagement with the outer side of the tag 1. The projecting ends of the rivet 3 and the core 5 are then upset in a manner to form the flange 10 on the rivet and a head 11 on the core and to further provide the flange portion 12 on the head 11 which encircles the periphery of the flange 10. The flange 10 and the flange 12 abut the washer 9. The head 11 has formed thereon suitable identifying indicia 13 as has also the head 6.

It will thus be seen that securing means for the tag 1 have been provided which include a metallic seal of a construction and arrangement which is such that the tag cannot be removed without destroying the securing means. The indicia provides means whereby the correct ownership of the automobile may be readily ascertained by consulting records which are made at the time that the securing devices or means are issued.

It is believed that the many advantages of an automobile tag securing and identification means in accordance with this invention will be readily understood, and although the preferred embodiment of the invention is as illustrated and described, it is to be understood that changes in the details of construction may be had which will fall within the scope of the invention as claimed.

What is claimed is:—

1. Securing and identification means for mounting a tag on a support, said support and the tag having registering openings therein, comprising a tubular rivet extending through the registering openings, outturned flanges on the ends of the rivet, a core of comparatively soft metal extending through the rivet, heads on the ends of the core extending over the rivet flanges, and inturned flanges on the marginal portions of the heads encircling the peripheries of the rivet flanges.

2. Securing and identification means for mounting a tag on a support, said support and the tag having registering openings therein, comprising a tubular rivet extending through the registering openings, washers mounted on the rivet and disposed in abutting engagement with remote sides of the support and the tag, outturned flanges on the ends of the rivet engaged with the washers, a core of comparatively soft metal extending through the rivet, heads formed integrally on the ends of the core and extending over the rivet flanges.

3. Securing and identification means for mounting a tag on a support, said support and the tag having registering openings therein, comprising a tubular rivet extending through the registering openings, washers mounted on the rivet and disposed in abutting engagement with remote sides of the support and the tag, outturned flanges on the ends of the rivet engaged with the washers, a core of comparatively soft metal extending through the rivet, heads formed integrally on the ends of the core and extending over the rivet flanges, and inwardly directed marginal flanges formed integrally on the heads, the last named flanges encircling the first named flanges and having their free ends in abutting engagement with the washers.

4. Securing and identification means for mounting a tag on a support, said support and the tag having registering openings therein, comprising a tubular rivet extending through the registering openings, and projecting therebeyond, washers mounted on the projecting end portions of the rivet and disposed in abutting engagement with the sides of the tag and the support which are remote from each other, out-turned flanges formed integrally with the ends of the rivet engaged with the washers, said flanges being of less external diameter than the washers, a core of comparatively soft metal extending through the rivet, heads formed integrally on the ends of the core extending over the rivet flanges, said heads being of greater diameter than the rivet flanges, inwardly directed flanges formed integrally on the marginal portions of the heads which are free of the rivet flanges, the second named flanges encircling the first named flanges and having their free ends in abutting engagement with the washers, the heads having identification indicia thereon.

In testimony whereof I affix my signature.

WILLIAM S. G. HEATH.